United States Patent [19]

Werber

[11] Patent Number: 4,910,423

[45] Date of Patent: Mar. 20, 1990

[54] OPEN HORSE SHOE ELECTRIC SELF BRAKING MOTOR

[76] Inventor: Manuel M. Werber, 41 Brookside Ter., North Caldwell, N.J. 07006

[21] Appl. No.: 141,092

[22] Filed: Jan. 5, 1988

[30] Foreign Application Priority Data

May 27, 1987 [IL] Israel ............................................ 82685
Aug. 27, 1987 [MX] Mexico ..................................... 112491

[51] Int. Cl.$^4$ .......................... H02K 7/10; B60T 13/04
[52] U.S. Cl. ....................................... 310/77; 310/211; 188/171
[58] Field of Search ...................... 310/77, 92, 93, 211, 310/42; 188/161, 162, 164, 171, 174

[56] References Cited

U.S. PATENT DOCUMENTS

| | | | |
|---|---|---|---|
| 3,407,319 | 10/1968 | Arraiza | 310/77 |
| 3,502,918 | 3/1970 | Done et al. | 310/77 |
| 3,535,568 | 10/1970 | Haverkamp | 310/77 |
| 4,277,734 | 7/1981 | Uhrner et al. | 318/758 |
| 4,381,048 | 4/1983 | Haverkamp et al. | 310/77 |

FOREIGN PATENT DOCUMENTS

| | | | |
|---|---|---|---|
| 2805063 | 8/1979 | Fed. Rep. of Germany | 310/77 |
| 27475 | 6/1971 | Israel . | |
| 66529 | 10/1950 | Netherlands | 310/77 |

*Primary Examiner*—Patrick R. Salce
*Assistant Examiner*—D. L. Rebsch
*Attorney, Agent, or Firm*—Browdy and Neimark

[57] ABSTRACT

An electric motor and brake comprises a stator, a rotor, a rotatable brake member and a fixed brake member, the rotor carrying a magnetic actuator at one of its ends. A coupling mechanism couples the rotatable brake member to the motor to rotate with the rotor but to be axially displaceable with respect thereto, and the rotatable brake member is made at least in part of magnetic material, so that it is attracted axially toward the magnetic actuator and away from the fixed brake member by the magnetic field produced by current flowing through the rotor. A spring is provided for urging the rotatable brake member away from the actuator and into engagement with the fixed brake member. The magnetic actuator is U-shaped and opened at one side, and the stator is in line at both its ends with the rotor.

3 Claims, 5 Drawing Sheets

OPEN HORSE SHOE ELECTRIC SELF BRAKING MOTOR

FIELD OF INVENTION

The present invention relates to improvements in electric motors, and particularly to an improved self braking means in an electric motor and to a method for making the rotor thereof.

BACKGROUND OF INVENTION

Self braking motors have been in use for many years. There are known different devices and patents for such motors, differing in methods and ideas used. One such motor is described in Israeli patent No. 27,475 which is most pertinent to the present invention. Nevertheless, the present invention differs in conception and in the method of manufacturing as will become apparent.

SUMMARY OF INVENTION

Objects of the present invention are to provide improvements in electric motors, and an improved self braking means in an electric motor construction wherein the brake is automatically actuated as soon as current to the electric motor is interrupted. Motors of this kind have a variety of uses such as in elevating equipment. A further object is to provide a method for making the rotor of the novel electric motor. A still further object is to provide an improved magnetic actuator for the braking means.

According to the invention, there is provided an electric motor and brake comprising a stator, a rotor, a rotatable brake member, and a fixed brake member (FIG. 1). The rotor carries a magnetic actuator at one end thereof (FIG. 2, 3 and 4). Coupling means are provided for coupling the rotatable brake member to the rotor to rotate with the rotor but to be axially displaceable with respect to the rotor, such rotatable brake member being wholly or partly made of magnetic material and attracted axially toward said magnetic actuator and away from the fixed brake member by the magnetic field produced by the current flowing through the rotor. A spring normally urging the rotatable brake member away from said actuator and into engagement with said fixed brake member is also provided. The said magnetic actuator is U-shaped (FIG. 2, 3 and 4), and thus "open" at one side thereof, with the stator being in line at both ends thereof with the rotor.

According to a further feature, the invention provides a method of making the rotor of an electric motor as described above by placing into a mold the magnetic core of the rotor with the magnetic actuator at one end of the core. The magnetic actuator is in the form of a ring of magnetic material having a plurality of U-shaped magnetic sectors spaced away from each other around the periphery as a ring, characterized by an orientation thereof so that the open end of the "U" faces the braking means. Molten conductive material is poured into the mold to form the conductive bars (FIGS. 2, 3 and 4) passing through the core and the conductive rings 5 shorting or closing the current with the bars at both ends of the core, one of the conductive rings filling the spaces within the magnetic U-shaped sectors and forming axially extending separators 5' (FIG. 4B, cross-section B—B); in the spaces between adjacent magnetic sectors, in FIGS. 2, 3 and 4 so as to leave the U-shaped magnetic sectors mostly or wholly separated from adjacent ones by one of the axially extending conductive separators.

The invention will now be described with reference to the annexed drawings.

No cutting off of a non-functional ring need be done with this method of manufacture.

Figure 4:
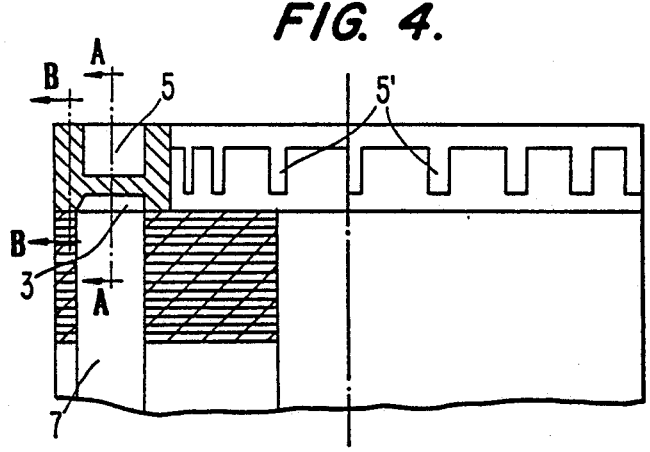
FIG. 4 is the longitudinal section view of a complete sector inversed with open end facing towards the moving braking part and giving the maximum magnetic pull, since it has the lower part of the U-shaped sector facing the rotor. There are two rings in the upper part (3,5) for closing the circuit. The short circuit ring 3 allows the molten aluminum to pass between the sectors to ring 5.
Figure 4A:
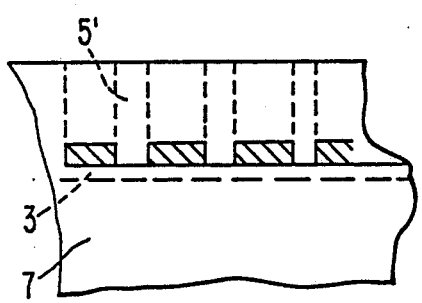

FIG. 4A is an exploded cross-sectional view along the line A—A of FIG. 4.

Figure 4B:
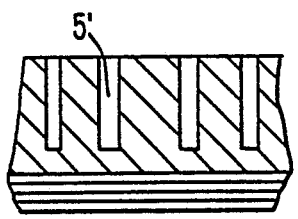

FIG. 4B is an exploded cross-sectional view along the line B—B of FIG. 4.

Figure 5:
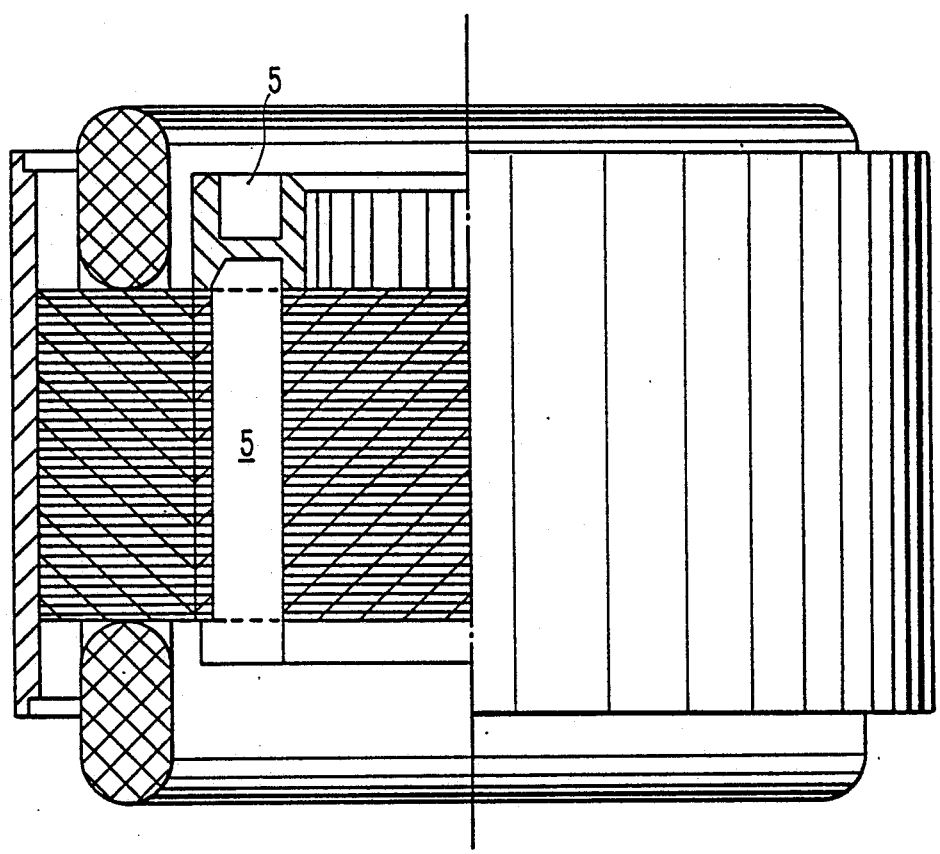

FIG. 5 is a longitudinal section view of a complete sector inversed with one end facing towards the moving brake part shown with the motor.

Figure 6:
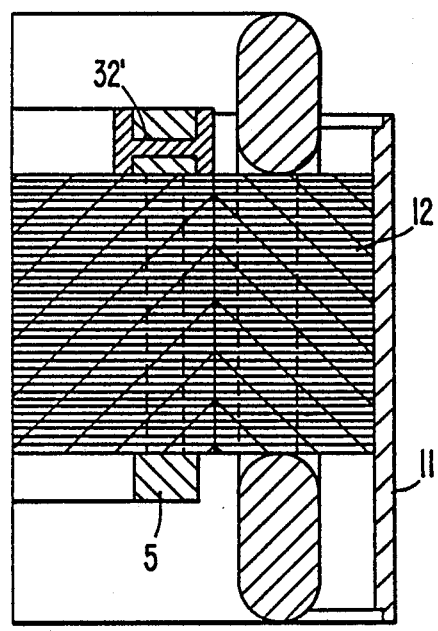

FIG. 6 is a longitudinal section view of the motor including an H-shaped annular magnetic actuator.

DETAILED DESCRIPTION OF THE INVENTION

Figure 1:
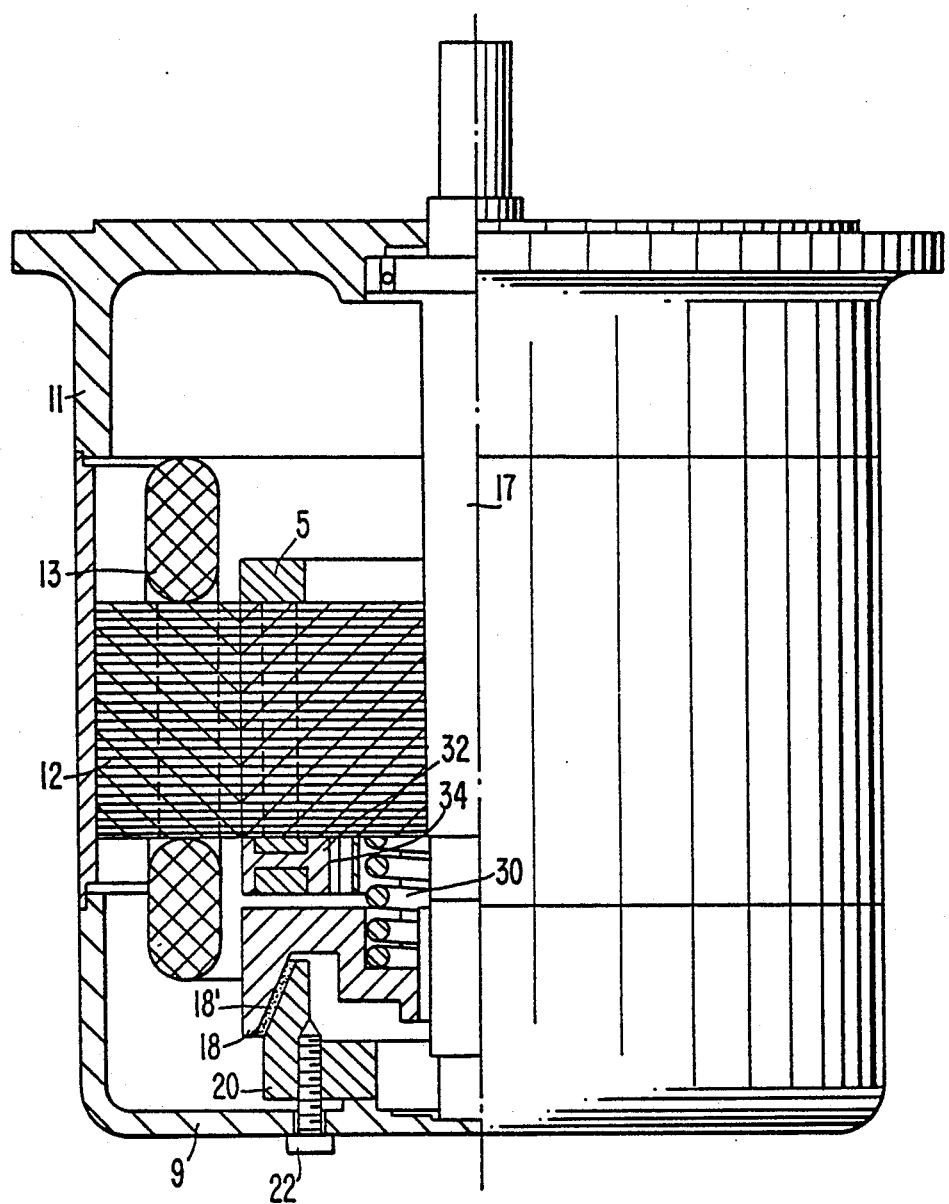
FIG. 1 is a longitudinal section view of the complete motor in which the rotor laminations and the stator laminations are the same length. There is no direct magnetic field from the stator influencing the sectors.

As shown in the general cross-section view of FIG. 1, the braking means comprises three interacting members. The first member 34 is a magnetic ring formed of sectors 32 coupled to the rotor motor, becoming the electromagnet which pulls and releases a second member 18 constituting a female cone brake, containing friction material 18'. The second member 18, 18' is capable of moving in an axial manner with respect to the rotor along the shaft, towards or away from the first and third member. The second member 18,18' has a conical braking surface corresponding to a conical breaking surface on the third member 20 constituting a stationary male cone brake. The third member 20 is fixed to the motor housing. A coil spring 30 is placed between the rotor and the second member 18,18' causing the latter to engage with the fixed third member 20, stopping or holding the rotation of the rotor.

The motor rotor carries the magnetic ring or actuator 34 at the end of the rotor adjacent to the second brake member 18,18'. The actuator is of annular shape and comprises a plurality of magnetic sectors 32 extending circumferentially thereabout, each magnetic sector 32 being wholly or partially separated from the adjacent ones by a separator of non-magnetic material.

The braking device functions in the following manner: when no current is applied to the motor windings, the rotor will not rotate, and the spring 30 will force the second conical brake member 18 against the fixed third conical brake member 20, thereby stopping rotation of the rotor. As soon as current is applied to the motor, a magnetic field will be produced in the first member by the current flowing across the conductive bars and a short circuiting conductive ring 5 in the first member.

The magnetic field also interacts with the magnetic field produced in the field winding to cause the rotor to rotate, as is customary in conventional electric motors. The current flowing in the conductive bars and the short circuiting conductive ring 5 will also produce a magnetic field within the magnetic sectors 32, causing the latter to pull the second member 18 (female cone brake), 18' (friction material in the cone) out of engagement with the fixed third member 20, thus releasing the rotor for rotation.

As soon as the current to the field winding is interrupted, the flow of inducted current through the conductive bars and ring will terminate, thus terminating the magnetic field within the section 32. The spring will then restore the second member 18 against the fixed third member 20 thereby braking the rotor against rotation. Experience has shown that although the above-described arrangement works, the attraction force of the magnetic actuator is in some instances not strong enough, for instant braking.

Turning to FIG. 1 there is shown the motor including a housing 11, a stator 12, stator windings 13, and a rotor fixed to the rotor shaft 17. The rotor is of the squirrel cage type and includes a slotted laminated core of magnetic material carrying longitudinally extended conductive bars short-circuited at both ends by conductive rings 5. As known in induction motors, the stator windings 13 produce a rotating magnetic field which induces a voltage in the conductive bars of the rotor, the current flowing through the latter producing a magnetic field which interacts with the stator magnetic field to produce the motor action. The electric motor includes braking means having a first braking member which is coupled to the rotor while the second is fixed to the housing as described herein. As can be seen, an important innovation is that each of the magnetic sectors is of U-shaped or H-shape configuration - the side which faces the braking means is "open" which basically differs from previous constructions. FIG. 6 shows sectors 32' having an H-shape cross-section.

Figure 2:
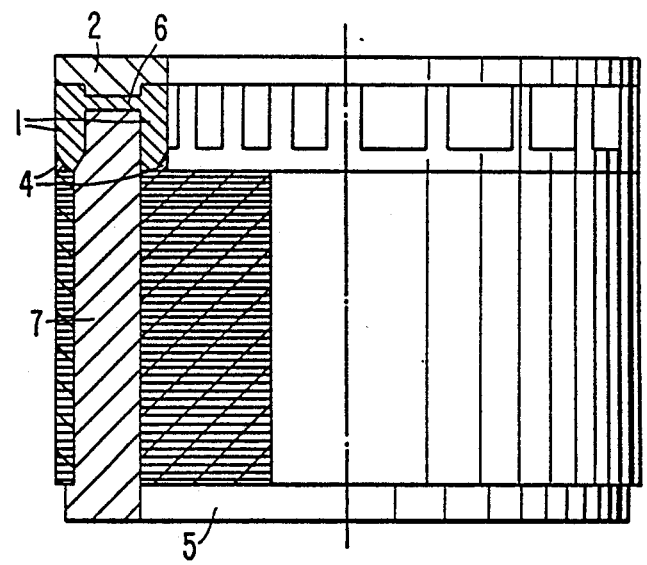
FIG. 2 is a longitudinal section view of the rotor having one option of a thin wall 6 holding the two parts of the sector, but having two aluminum rings 4 to hold the sector 1.
Figure 3:
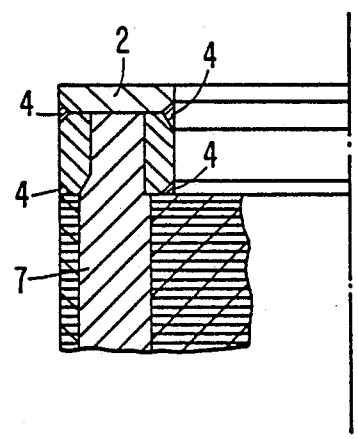
FIG. 3 is also a longitudinal section view of the rotor showing a second option having also a magnetic material ring 2 which will be taken off after casting. Also in FIG. 3, four aluminum rings 4 hold the sectors but without thin wall 6.

The method of manufacturing the rotor is as follows: the slotted magnetic laminations constituting the core of the rotor are placed into a mold, and the annular magnetic actuator is placed into the mold at one end of the core. The magnetic actuator is in the form of a ring of magnetic material having a plurality of the U-shaped or H-shaped magnetic sectors spaced from each other around the circumference of the ring. The ring is placed into the mold so that the sectors are oriented so that the open end of the U faces the braking means. Molten conductive material, such as aluminum or copper is then poured into the mold and flows through the slots in the core to form the conductive bars 7 and also the end rings 5, which short-circuit the bars 7, one ring being formed within the U-shaped magnetic sectors. The conductive material also flows into the spaces between the magnetic sectors and forms the axially extending separators between adjacent sectors. The second ring of magnetic material is then removed, in FIGS. 2 and 3, by cutting or grinding, leaving the U-shaped magnetic sectors each individually embracing the conductive ring and separated from each other by the axially extending conductive separators and facing the moving braking part 18-18'.

In FIG. 4 there is no need to remove any second ring while the U-shape is facing the moving part 18-18'. There is no cutting-off operation in FIG. 4. Referring to FIGS. 4A and 4B, there was no way to position the U shape in the outward position, at least not until the present invention using the H shape. This H shape was difficult to obtain, for it must be considered how the flow of the molten aluminum passes through the connecting rods of the squirrel cage and into the H shape and forms two short circuit rings. One ring, the closer one, lets the aluminum come out of the passages/rods, and the other ring forms the bulk of the shorting ring which in turn causes the magnetic flux. The number of sectors must be different from the number of rods, otherwise the motor will not operate smoothly.

It will be obvious to those skilled in the art that various changes may be made without departing from the scope of the invention and the invention is not to be considered limited to what is shown in the drawings and described in the specification.

What is claimed is:

1. A self braking electric motor comprising
   a stator;
   a rotor mounted on a shaft for rotation thereabout;
   a magnetic actuator carried on one end of said rotor;
   a rotatable brake member made at least partially of magnetic material and mounted for axial displacement with respect to said rotor and displacement towards said magnetic actuator in response to a magnetic field produced by current flowing through said rotor;
   a fixed brake member mounted in axial displacement from said rotatable brake on the opposite side of said rotatable brake member from said magnetic actuator;
   a spring mounted so as to normally urge said rotatable brake member away from said magnetic actuator and into engagement with said fixed brake member;
   said magnetic actuator extending axially from and outside of said rotor and having an H-shape with an open side of said H-shape facing said rotatable brake member.

2. The self braking electric motor of claim 1 wherein said stator and said rotor have substantially equal axial lengths along said shaft.

3. The self braking electric motor of claim 1 wherein said stator and said rotor are composed of stacks of laminated material of equal axial lengths.

* * * * *